(12) United States Patent
Trieb

(10) Patent No.: US 8,631,929 B2
(45) Date of Patent: Jan. 21, 2014

(54) CONVEYOR FOR THE TRANSPORT OF BULK MATERIALS

(75) Inventor: Herbert Trieb, Lochau (AT)

(73) Assignee: Innova Patent GmbH, Wolfurt (AT)

( * ) Notice: Subject to any disclaimer, the term of this patent is extended or adjusted under 35 U.S.C. 154(b) by 40 days.

(21) Appl. No.: 13/303,448

(22) Filed: Nov. 23, 2011

(65) Prior Publication Data

US 2012/0138432 A1 Jun. 7, 2012

(30) Foreign Application Priority Data

Dec. 2, 2010 (AT) ................................ A 2004/2010

(51) Int. Cl.
*B66B 23/22* (2006.01)
(52) U.S. Cl.
USPC .................... 198/845; 198/838; 198/836.1
(58) Field of Classification Search
USPC ........... 198/845, 838, 823, 861.1, 860.1, 681, 198/817, 836.1, 137; 482/137
See application file for complete search history.

(56) References Cited

U.S. PATENT DOCUMENTS 5,165,512 A * 11/1992 Driear .......................... 198/318
6,588,583 B2  7/2003 Trieb
6,935,490 B2  8/2005 Trieb
2003/0051981 A1 * 3/2003 Trieb ........................... 198/838
2009/0101473 A1 * 4/2009 Berchtold ..................... 198/499

FOREIGN PATENT DOCUMENTS

EP 1 295 817 B1 3/2003
EP 1 452 466 B1 9/2004

* cited by examiner

*Primary Examiner* — Gene Crawford
*Assistant Examiner* — Lester Rushin
(74) *Attorney, Agent, or Firm* — Laurence A. Greenberg; Werner H. Stemer; Ralph E. Locher

(57) ABSTRACT

A conveyor for the transport of bulk materials contains three pairs of supporting cables disposed vertically one above the other. A conveyor belt is movable along the supporting cables from a loading station to an unloading station. The conveyor belt has supporting beams disposed at a distance apart and at the ends of which are rollers, which roll along the middle and lower supporting cables. The conveyor further contains supporting frames by which the supporting cables are mutually connected. The supporting frames have two vertically aligned supporting struts and two horizontally aligned connecting struts. Furthermore, the upper ends of the supporting struts are respectively connected to one of the two upper supporting cables and the connecting struts are connected to the middle and the lower supporting cables. The supporting struts are formed by two supporting strut parts, which are mutually pivotable about horizontal axes aligned transversely to the supporting cables.

8 Claims, 4 Drawing Sheets

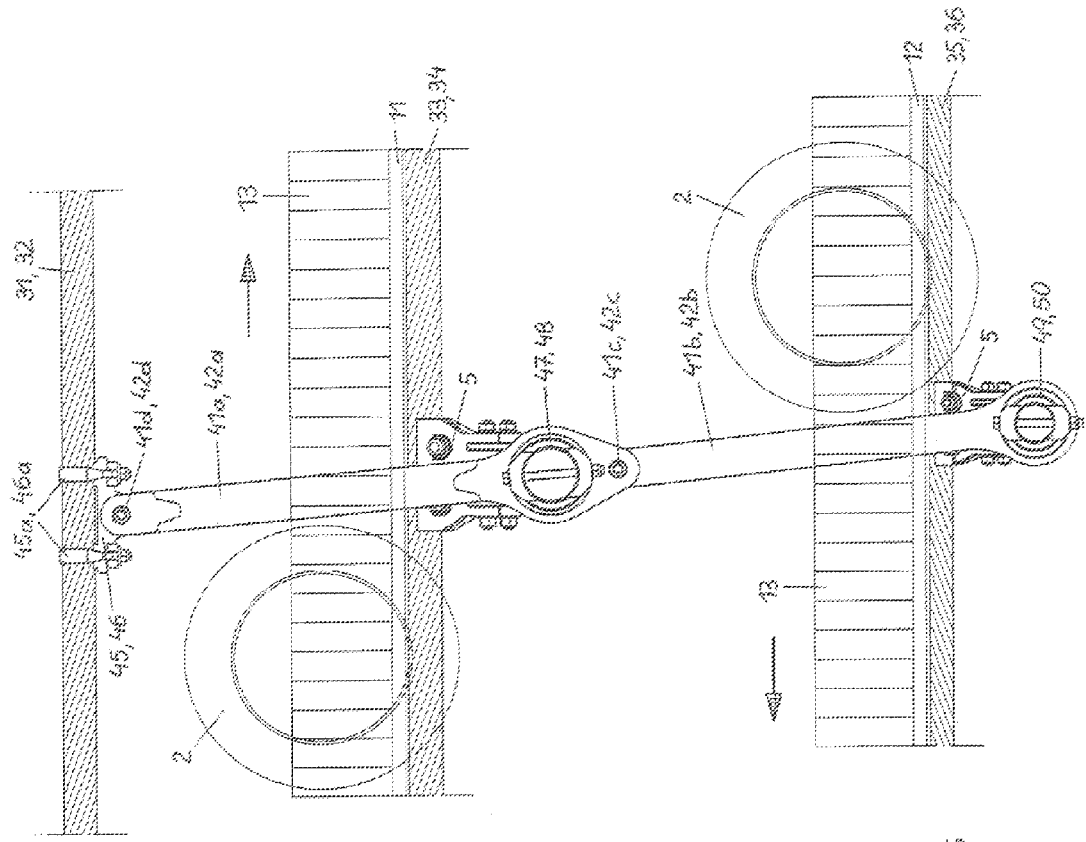
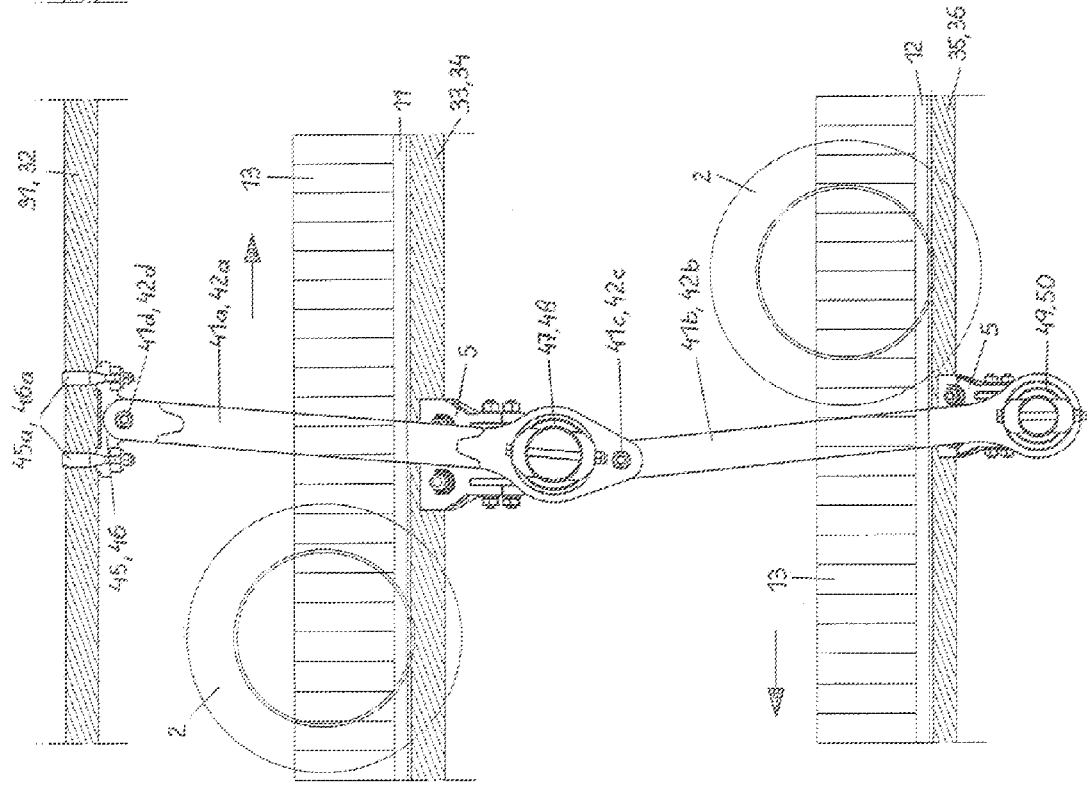
FIG. 3B
FIG. 3C

US 8,631,929 B2

CONVEYOR FOR THE TRANSPORT OF BULK MATERIALS

CROSS-REFERENCE TO RELATED APPLICATION

This application claims the priority, under 35 U.S.C. §119, of Austrian application A 2004/2010, filed Dec. 2, 2010; the prior application is herewith incorporated by reference in its entirety.

BACKGROUND OF THE INVENTION

Field of the Invention

The present invention relates to a conveyor for the transport of bulk materials, containing three pairs of supporting cables, which are respectively located approximately vertically one above the other. The conveyor further contains a self-contained conveyor belt, which is movable along the supporting cables from a loading station to an unloading station and in the end stations is guided over return drums. The conveyor belt is configured with supporting beams, which are located at a distance apart and are aligned transversely to the longitudinal extent of the conveyor belt and at the ends of which are mounted rollers, which roll along the middle and the lower supporting cables. Supporting frames are provided, which are located at a distance apart in the longitudinal direction of the conveyor and by which the supporting cables are mutually connected. The supporting frames are formed by at least two at least approximately vertically aligned supporting struts and at least two at least approximately horizontally aligned connecting struts. The upper ends of the supporting struts are connected to respectively one of the two upper supporting cables and the connecting struts are connected to the middle and the lower supporting cables.

Conveyors of this type, which are known, for example, from European patents EP 1295817 B1, corresponding to U.S. Pat. No. 6,588,583, and European patent EP 1452466 B1, corresponding to U.S. Pat. No. 6,935,490, serve to convey bulk materials, such as overburden materials, ores, coal and the like, from a loading station to an unloading station. These conveyors have supporting cables, along which a self-contained conveyor belt is movable. Fastened for this purpose to the top side of the conveyor belt are supporting beams, which are aligned transversely to the conveyor belt and at both ends of which are mounted rollers by which the conveyor belt is moved along two pairs of supporting cables disposed vertically one above the other. In the end stations, the conveyor belt is guided over return drums. Above the two pairs of supporting cables, a further pair of supporting cables is provided. Furthermore, in the longitudinal direction of the conveyor are provided mutually spaced supporting frames, which serve to connect the supporting cables one to another to form a stable unit.

That strand of the conveyor belt which is moved along the middle pair of supporting cables serves to convey bulk materials from a loading station to an unloading station. Along the pair of two lower supporting cables, the lower strand of the conveyor belt is moved back from the unloading station to the loading station. The upper pair of supporting cables serves to stabilize the conveyor.

The supporting frames are formed by two vertically aligned supporting struts and by two horizontally aligned connecting struts connected to the vertical supporting struts. The upper ends of the vertically aligned supporting struts are fixedly connected to the two upper supporting cables, and the two horizontally aligned connecting struts are fixedly connected to the middle and the lower supporting cables. The supporting frames within the conveyor, in which both the supporting cables and the conveyor belt are elastic, constitute rigid structural parts.

During operation of such conveyors, due to the movement of the conveyor belt which is loaded over its length with different quantities of bulk materials, high and variable tension forces arise in the supporting frames due to the hereby variable loads, so that the need exists to configure the supporting frames with appropriate strengths and dimensions. This engenders, on the one hand, high material expenditure and, on the other hand, high loads upon the supporting cables.

SUMMARY OF THE INVENTION

It is accordingly an object of the invention to provide a conveyor for the transport of bulk materials which overcome the above-mentioned disadvantages of the prior art methods and devices of this general type.

With the foregoing and other objects in view there is provided, in accordance with the invention a conveyor for transporting bulk materials. The conveyor contains three pairs of supporting cables disposed respectively approximately vertically one above another and include lower supporting cables, middle supporting cables and upper supporting cables. A self-contained conveyor belt is movable along the supporting cables from a loading station to an unloading station and in the loading station and the unloading station being guided over return drums. The conveyor belt has supporting beams disposed at a distance apart and aligned transversely to a longitudinal extent of the conveyor belt and at ends of the supporting beams are disposed mounted rollers. The mounted rollers rolling along the middle and the lower supporting cables. Supporting frames are disposed at a distance apart in a longitudinal direction of the conveyor and by which the supporting cables are mutually connected. Each of the supporting frames are formed from at least two at least approximately vertically aligned supporting struts and at least two at least approximately horizontally aligned connecting struts. The supporting struts have upper ends respectively connected to one of the upper supporting cables. The connecting struts are connected to the middle and the lower supporting cables. The supporting struts on the upper supporting cables are pivotable about an at least approximately horizontal axis aligned transversely to the supporting cables, and the supporting struts are formed by two supporting strut parts, which are mutually pivotable about at least approximately horizontal axes aligned transversely to the supporting cables.

The object of the present invention is to improve the configuration of the supporting frames such that the material expenditure necessary for the supporting frames, and thus the weight thereof, can be lowered, while the efficiency of the conveyor remains constant. This is achieved according to the invention by virtue of the fact that the supporting struts on the upper supporting cables are pivotable about an at least approximately horizontal axis aligned transversely to the supporting cables, and that the supporting struts are formed by two strut parts, which are mutually pivotable about at least approximately horizontal axes aligned transversely to the supporting cables. Furthermore, at least one of the two connecting struts is preferably mounted on the two supporting struts rotatably about an at least approximately horizontal axis aligned transversely to the supporting cables.

According to a preferred embodiment, for the connection of the supporting struts to the upper supporting cables a supporting bar is provided, on which the respectively upper end of the upper supporting strut parts is mounted pivotably about an axis aligned transversely to the supporting cables and which is fixedly connected to the associated supporting cable, preferably by at least one bracket. Furthermore, the upper supporting strut parts, at their lower ends, are preferably configured with respectively a hub, in which hubs the upper connecting strut is rotatably mounted and beneath which hub the lower supporting strut parts are articulately coupled to the upper supporting strut parts. Moreover, the lower supporting strut parts, too, are preferably configured at their lower ends with respectively a hub, in which hubs the lower connecting strut is rotatably mounted. Furthermore, the two connecting struts are preferably configured, in contact with the respectively assigned supporting part, with respectively a clamp for the fixed connection of the supporting frame to the respectively assigned supporting cable.

Other features which are considered as characteristic for the invention are set forth in the appended claims.

Although the invention is illustrated and described herein as embodied in a conveyor for the transport of bulk materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3, FIG. 3A, FIG. 3B and FIG. 3C are side views of the conveyor which is represented in FIG. 2, in four different operating settings.

DETAILED DESCRIPTION OF THE INVENTION

Figure 1:
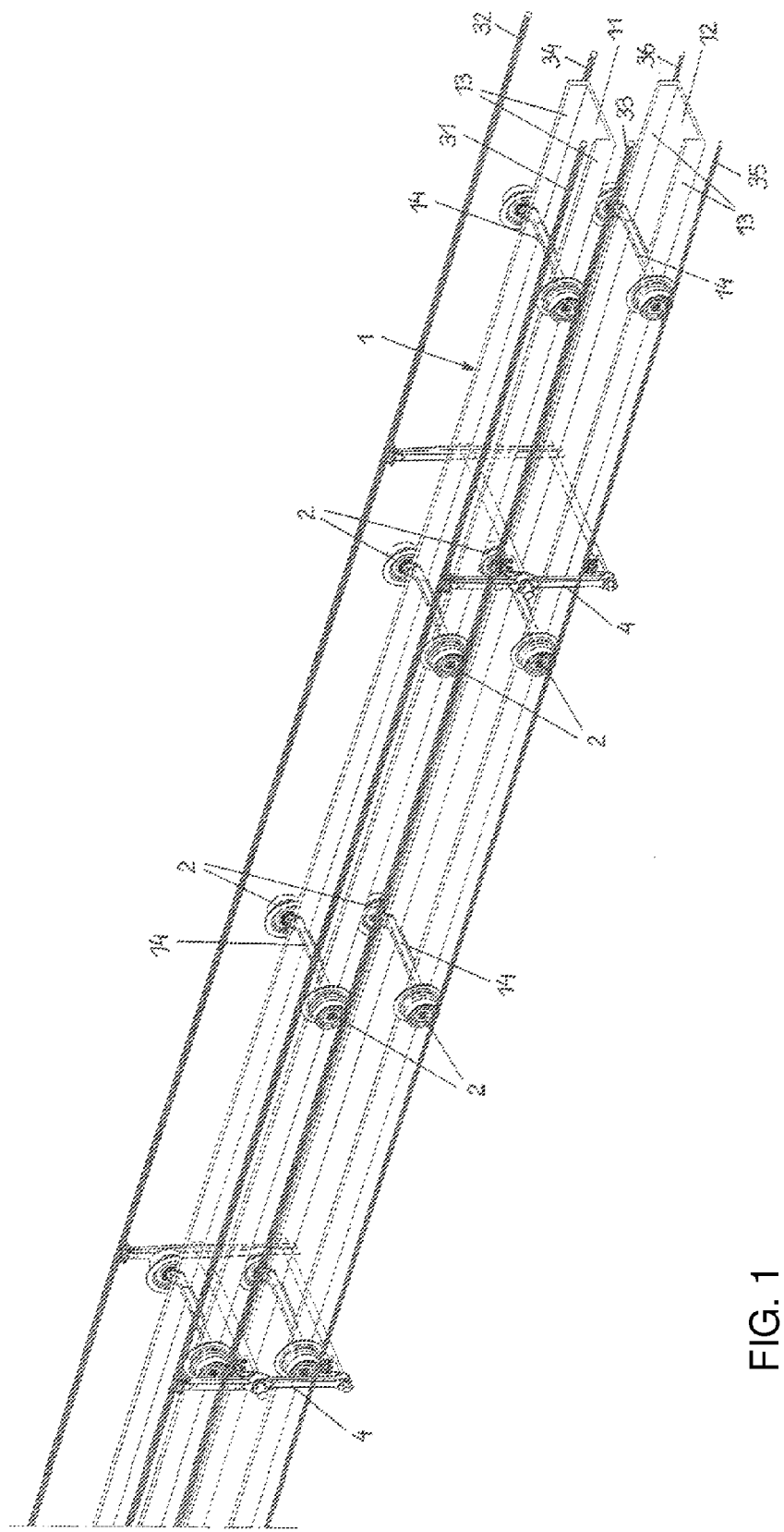
FIG. 1 is a diagrammatic, perspective view of a part of a conveyor for bulk materials according to the invention.

Referring now to the figures of the drawing in detail and first, particularly, to FIG. 1 thereof, there is shown a portion of a conveyor for bulk materials, such as overburden materials, ores, coal and the like. The conveyor contains a self-contained conveyor belt 1, which extends from a loading station to an unloading station and which in the two end stations is guided over return drums. An upper strand 11 of the conveyor belt 1 serves to convey the bulk materials from the loading station to the unloading station. After the unloading station and also before the loading station in a motional direction of the conveyor belt 1 are found turning devices, by which the lower strand 12 of the conveyor belt 1, which strand has been moved from the unloading station back to the loading station, is turned such that, even when the lower strand 12 of the conveyor belt 1 has been moved back to the loading station, the loading surface is found on the top side thereof, whereupon the lower strand 12 is turned back again before the loading station and in this position is guided around the return drum present in the loading station.

The conveyor belt 1 is configured on its two side margins with lateral, elastically deformable bars, so-called corrugated sidewalls 13, protruding up from its top side. Furthermore, the conveyor belt 1 is configured on its top side with supporting beams 14 which are aligned transversely to its motional direction and on the free ends of which are mounted rollers 2. The conveyor further has three pairs of supporting cables 31, 32, 33, 34, 35, 36, which are disposed one above the other and which are mutually connected by supporting frames 4, whereby the entire conveyor is stabilized. The rollers 2 are guided along the middle and lower supporting cables 33 to 36, whereby the conveyor belt 1 is movable along the supporting cables 33 to 36, whereby the bulk materials are conveyed from the loading station to the unloading station.

Figure 2:
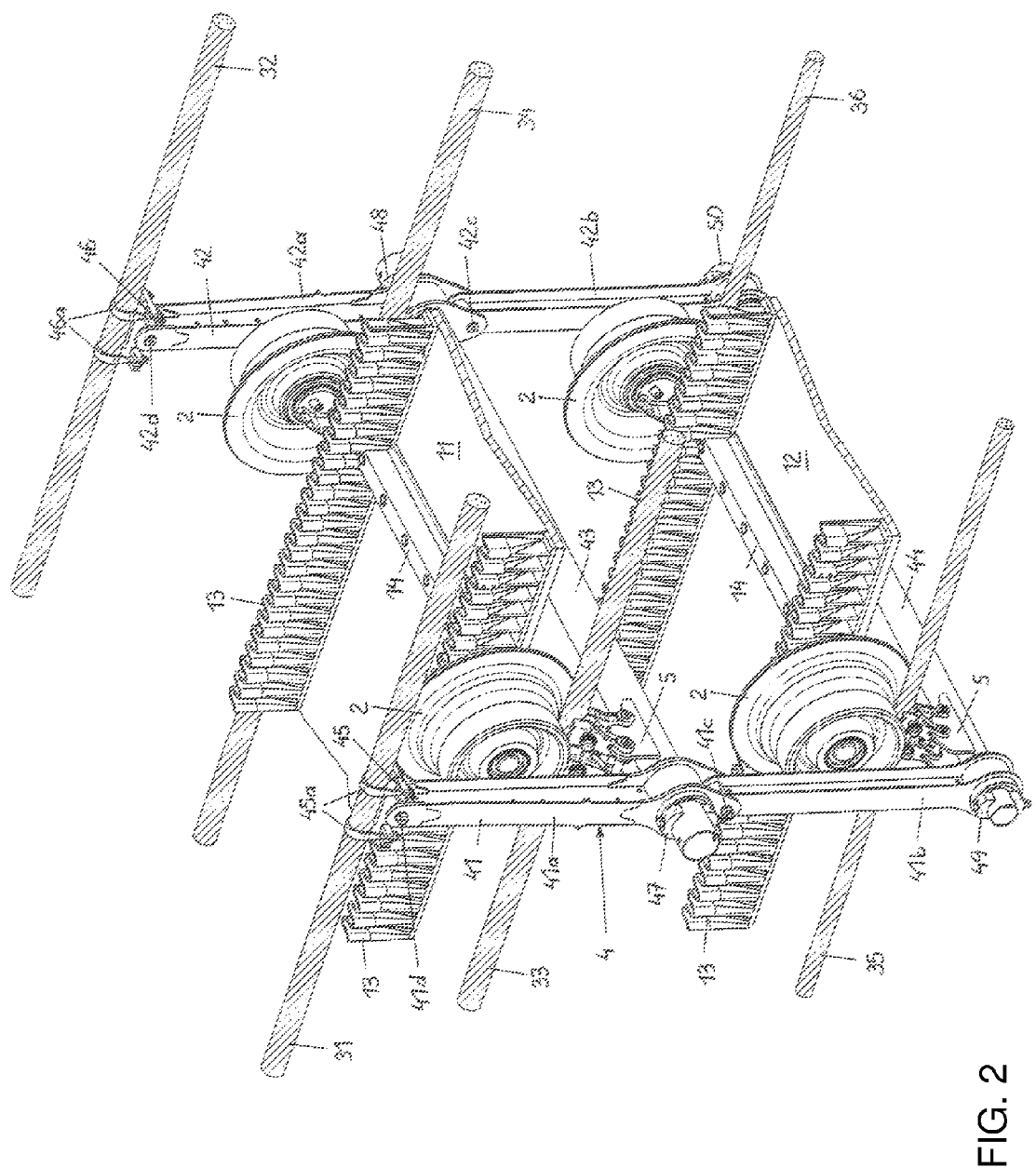
FIG. 2 is a perspective view of the part of the conveyor represented in FIG. 1, on an enlarged scale in relation to FIG. 1.

In FIG. 2, the upper supporting cables 31 and 32, the middle supporting cables 33 and 34 and the lower supporting cables 35 and 36 are likewise represented. Along the middle supporting cables 33 and 34, the upper strand 11 of the conveyor belt 1 is moved from the loading station to the unloading station by the rollers 2. Along the lower supporting cables 35 and 36, the lower strand 12 of the conveyor belt 1 is moved in its turned position from the unloading station back to the loading station. At the lateral margins of the conveyor belt 1, protruding from the latter, are the approximately vertically upwardly directed corrugated sidewalls 13, which are extensible, whereby the conveyor belt 1 can be guided in the stations over the return drums present there. On the top side of the conveyor belt 1 are found the supporting beams 14, at whose ends are mounted the rollers 2, which roll along the supporting cables 33 and 34 and 35 and 36 respectively.

As can further be seen from FIG. 2, the supporting frames 4 are formed by two vertical supporting struts 41 and 42 and by two horizontal connecting struts 43 and 44. The supporting struts 41 and 42 here respectively consist of two supporting strut parts 41a and 41b and 42a and 42b, which are articulately connected to each other by a hinge pin 41c and 42c respectively. These two hinge pins 41c and 42c are aligned approximately horizontally and transversely to the supporting cables 31 to 36. Furthermore, the upper ends of the supporting strut parts 41a and 42a are mounted by hinge pins 41d and 42d, likewise pivotably about approximately horizontal axes aligned transversely to the supporting cables 31 to 36, on supporting bars 45 and 46, which are fastened by brackets 45a and 46a to the upper supporting cables 31 and 32.

Moreover, the respectively upper supporting strut parts 41a and 42a are configured in their lower region with hubs 47 and 48, into which the connecting strut 43, configured as cylindrical pipe sections, projects and is rotatably mounted therein. In the same way, the lower supporting strut parts 41b and 42b are configured at their lower ends with hubs 49 and 50, into which the lower connecting strut 44, configured as a cylindrical pipe section, projects and is rotatably mounted therein. The connecting struts 43 and 44 are configured at their lateral ends with clamps 5, by which they are fixedly connected to the middle supporting cables 33 and 34 and to the lower supporting cables 35 and 36.

As a result of the articulate mounting of the individual components of the supporting frames 4, these can adapt in their position to the varying loads generated by the operation of the conveyor, whereby the stresses which arise in these are heavily reduced.

Figure 3:
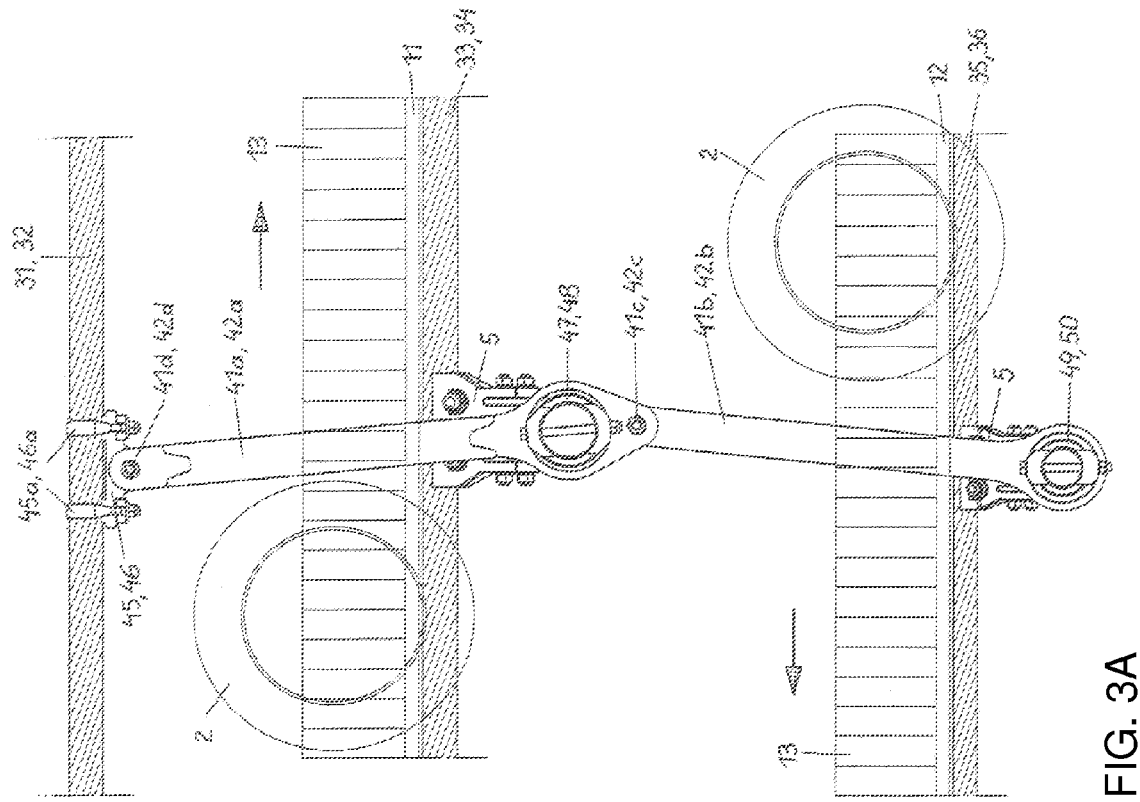

In FIG. 3 are represented those positions of the individual components of the supporting frames 4 which arise when the conveyor belt 1 is evenly loaded. However, insofar as the upper strand 11 of the conveyor belt 1 is unevenly loaded with bulk materials over its length, the supporting cables 33 to 36, upon movement of the conveyor belt 1, change their positions, whereby constantly variable loads are generated in the supporting frames 4. As a result of the articulated connections of the supporting frames 4 to the supporting cables 31 and 32, on the one hand, and the articulated connections of the supporting strut parts 41a and 41b and 42a and 42b one to another, as well as of the connecting struts 43 and 44 to the supporting struts 41 and 42, on the other hand, the individual components of the supporting frames 4 adopt those positions which are consistent with the changing loads, whereby the stresses generated in the supporting frames 4 are greatly reduced.

Figure 3A:
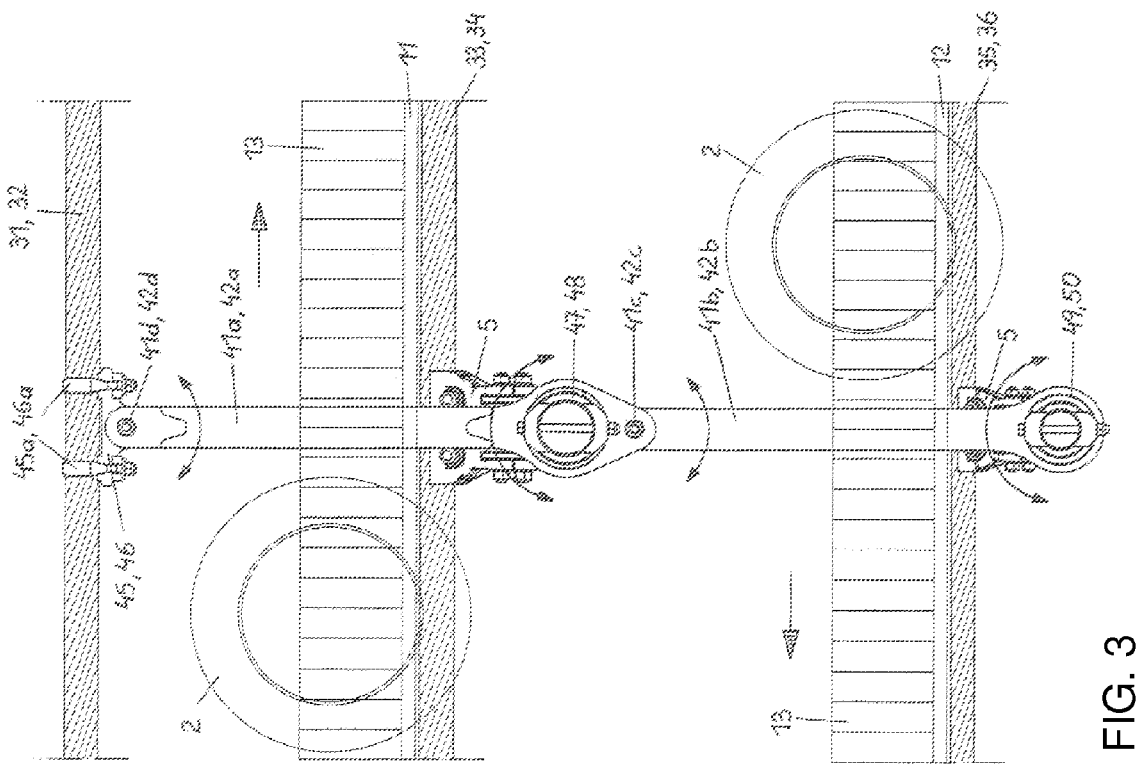

Correspondingly altered positions of the individual components of the supporting frames 4 are represented in FIG. 3A, FIG. 3B and FIG. 3C. In this context, it is pointed out that the angular positions are represented on an exaggerated scale in order to illustrate the function of the articulated connections.

The invention claimed is:

1. A conveyor for transporting bulk materials, comprising:
   three pairs of supporting cables disposed respectively approximately vertically one above another and including lower supporting cables, middle supporting cables and upper supporting cables;
   mounted rollers;
   a self-contained conveyor belt being movable along said supporting cables from a loading station to an unloading station and in said loading station and said unloading station being guided over return drums, said conveyor belt having supporting beams disposed at a distance apart and aligned transversely to a longitudinal extent of said conveyor belt and at ends of said supporting beams are disposed said mounted rollers, said mounted rollers rolling along said middle and said lower supporting cables; and
   supporting frames disposed at a distance apart in a longitudinal direction of the conveyor and by means of which said supporting cables being mutually connected, each of said supporting frames formed from at least two at least approximately vertically aligned supporting struts and at least two at least approximately horizontally aligned connecting struts and, said supporting struts having upper ends respectively connected to one of said upper supporting cables, said connecting struts connected to said middle and said lower supporting cables, said supporting struts on said upper supporting cables being pivotable about an at least approximately horizontal axis aligned transversely to said supporting cables, and said supporting struts are formed by two supporting strut parts, which are mutually pivotable about at least approximately horizontal axes aligned transversely to said supporting cables.

2. The conveyor according to claim 1, wherein at least one of said two connecting struts is mounted on said two supporting struts rotatably about an at least approximately horizontal axis aligned transversely to said supporting cables.

3. The conveyor according to claim 1, further comprising supporting bars, wherein for a connection of said supporting struts on said upper supporting cables said supporting bars are provided, on which an upper end of said supporting struts is pivotably mounted and said support bars are fixedly connected to associated ones of said supporting cables.

4. The conveyor according to claim 1,
   further comprising hubs;
   wherein said connecting struts include an upper connecting strut and a lower connecting strut; and
   wherein said two supporting strut parts include lower supporting strut parts and upper supporting strut parts each having a lower end, and at said lower end have one of said hubs, and in which said hubs said upper connecting strut is rotatably mounted.

5. The conveyor according to claim 4, wherein said lower supporting strut parts, beneath at least one of said hubs, are articulately coupled to said upper supporting strut parts.

6. The conveyor according to claim 4, wherein said lower supporting strut parts have lower ends engaging said hubs, in which said hubs said lower connecting strut is rotatably mounted.

7. The conveyor according to claim 1, further comprising clamps, said two connecting struts are configured, in contact with said supporting cables, via said clamps for a fixed connection of said supporting frame to said supporting cables assigned thereto.

8. The conveyor according to claim 3, further comprising brackets, said support bars are fixedly connected to associated ones of said supporting cables by at least one of said brackets.

* * * * *